(12) United States Patent
Longster

(10) Patent No.: US 6,396,921 B1
(45) Date of Patent: May 28, 2002

(54) METHOD AND SYSTEM FOR ENCODING AND DECODING TYPOGRAPHIC CHARACTERS

(75) Inventor: Gary Longster, St. Catharines (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/966,387

(22) Filed: Nov. 7, 1997

(51) Int. Cl.$^7$ .............................................. H04M 11/00
(52) U.S. Cl. ..................... 379/386; 379/93.26
(58) Field of Search .............................. 379/386, 93.27, 379/93.26, 93.18

(56) References Cited

U.S. PATENT DOCUMENTS

| | | | |
|---|---|---|---|
| 4,799,254 A | * 1/1989 | Dayton et al. | 379/93.26 |
| 4,897,865 A | 1/1990 | Canuel | 379/91 |
| 5,249,220 A | * 9/1993 | Moskowitz et al. | 379/93.26 |
| 5,390,240 A | 2/1995 | Sensney | 379/94 |
| 5,522,089 A | 5/1996 | Kikinis et al. | 395/893 |
| 5,905,476 A | * 5/1999 | McLaughlin et al. | 345/1 |

* cited by examiner

*Primary Examiner*—Stella Woo

(57) ABSTRACT

A system suitable for encoding typographic characters into two digit base ten values and to decode such values to typographic characters are disclosed. The system maps typographic characters, such as letters in the English language and puctuation symbols into two decimal digit numeric codes. The mapped numeric codes allow all upper and lower case English letters to be identified by a unique two digit code, that may be encoded using conventional DTMF tones. The system similarly decodes two digit numeric codes, so encoded. The system optionally include a DTMF generator and decoder. Methods used by the system are also disclosed.

8 Claims, 4 Drawing Sheets

| TYPO. CHAR. | STND. ASCII CODE | TWO DIGIT CODE |
|---|---|---|
| SPACE | 32 | 00 |
| ! | 33 | 01 |
| " | 34 | 02 |
| # | 35 | 03 |
| $ | 36 | 04 |
| % | 37 | 05 |
| & | 38 | 06 |
| ' | 39 | 07 |
| ( | 40 | 08 |
| ) | 41 | 09 |
| * | 42 | 10 |
| + | 43 | 11 |
| , | 44 | 12 |
| - | 45 | 13 |
| . | 46 | 14 |
| / | 47 | 15 |
| 0 | 48 | 16 |
| 1 | 49 | 17 |
| 2 | 50 | 18 |
| 3 | 51 | 19 |
| 4 | 52 | 20 |
| 5 | 53 | 21 |
| 6 | 54 | 22 |
| 7 | 55 | 23 |
| 8 | 56 | 24 |
| 9 | 57 | 25 |
| : | 58 | 26 |
| ; | 59 | 27 |
| < | 60 | 28 |
| = | 61 | 29 |
| > | 62 | 30 |
| ? | 63 | 31 |

| TYPO. CHAR. | STND. ASCII CODE | TWO DIGIT CODE |
|---|---|---|
| @ | 64 | 32 |
| A | 65 | 33 |
| B | 66 | 34 |
| C | 67 | 35 |
| D | 68 | 36 |
| E | 69 | 37 |
| F | 70 | 38 |
| G | 71 | 39 |
| H | 72 | 40 |
| I | 73 | 41 |
| J | 74 | 42 |
| K | 75 | 43 |
| L | 76 | 44 |
| M | 77 | 45 |
| N | 78 | 46 |
| O | 79 | 47 |
| P | 80 | 48 |
| Q | 81 | 49 |
| R | 82 | 50 |
| S | 83 | 51 |
| T | 84 | 52 |
| U | 85 | 53 |
| V | 86 | 54 |
| W | 87 | 55 |
| X | 88 | 56 |
| Y | 89 | 57 |
| Z | 90 | 58 |
| [ | 91 | 59 |
| \ | 92 | 60 |
| ] | 93 | 61 |
| ^ | 94 | 62 |
| _ | 95 | 63 |

| TYPO. CHAR. | STND. ASCII CODE | TWO DIGIT CODE |
|---|---|---|
| ` | 96 | 64 |
| a | 97 | 65 |
| b | 98 | 66 |
| c | 99 | 67 |
| d | 100 | 68 |
| e | 101 | 69 |
| f | 102 | 70 |
| g | 103 | 71 |
| h | 104 | 72 |
| i | 105 | 73 |
| j | 106 | 74 |
| k | 107 | 75 |
| l | 108 | 76 |
| m | 109 | 77 |
| n | 110 | 78 |
| o | 111 | 79 |
| p | 112 | 80 |
| q | 113 | 81 |
| r | 114 | 82 |
| s | 115 | 83 |
| t | 116 | 84 |
| u | 117 | 85 |
| v | 118 | 86 |
| w | 119 | 87 |
| x | 120 | 88 |
| y | 121 | 89 |
| z | 122 | 90 |
| { | 123 | 91 |
| \| | 124 | 92 |
| } | 125 | 93 |
| ~ | 126 | 94 |
|  |  |  |

FIG. 2

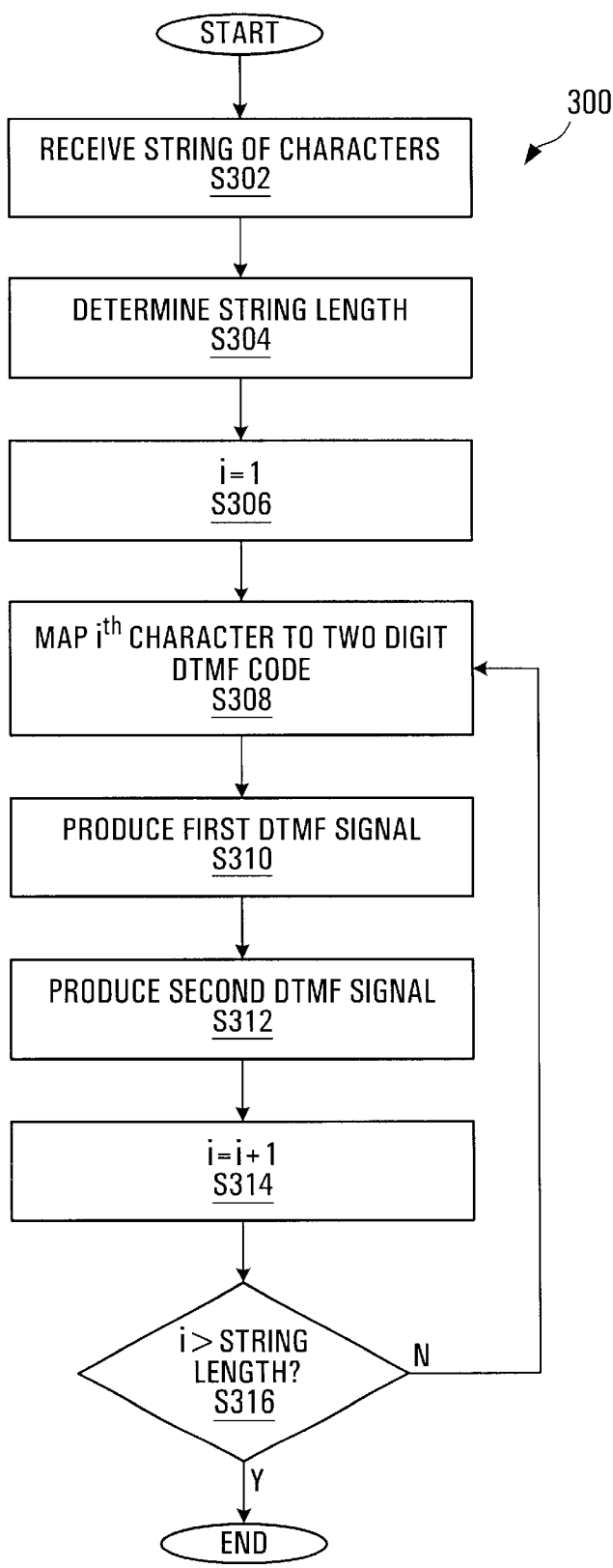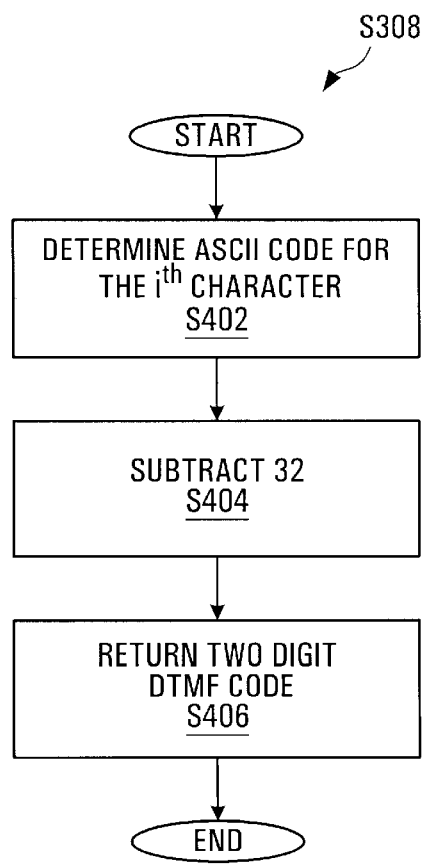
FIG. 3
FIG. 4

METHOD AND SYSTEM FOR ENCODING AND DECODING TYPOGRAPHIC CHARACTERS

FIELD OF THE INVENTION

The present invention relates to a method and system to encode and decode typographic characters, and more particularly to a method and system to encode typographic characters into two digit base ten values and to decode such values to typographic characters.

BACKGROUND OF THE INVENTION:

In order to facilitate the exchange of character data between computing devices, such devices typically encode characters using a standard mapping scheme. Each character is mapped to a numeric value. The numeric values are then exchanged. The most common mapping scheme used to exchange character data between computing devices is the American Standard Code for Information Interchange ("ASCII").

The standard ASCII scheme uses codes consisting of seven binary digits to map typographic characters including upper and lower case English letters, numbers, and punctuation symbols as well as control characters into numeric values. Each character is mapped to an ASCII code having a value between zero (0) and one-hundred and twenty-seven (127).

The seven binary digit ASCII scheme capitalizes on binary computational features of digital computers, and thus exhibits numerous base two-symmetries. For example, all characters in the English alphabet are mapped to codes having base ten (decimal) values between sixty-five (65) and one-hundred and twenty-two (122). Represented as binary values, these codes all have a "1" in bit six. Upper case letters in the English alphabet are mapped to ASCII codes having decimal values between sixty five (65) and ninety (90). Represented as binary values, these codes all have values of "0" in bit five. Each lower case character in the English alphabet is mapped to a code having a value corresponding to the code for the upper case character, incremented by thirty-two. Thus, lower case letters in the alphabet are mapped to decimal values between ninety-seven and one-hundred and twenty-two. Represented as binary values, lower case character values all have values of "1" in bit five. Thus, upper case characters may be transformed into lower case characters (and vice-versa) by simply logically inverting bit five of the ASCII code. Similarly, other base-two symmetries may be observed.

Seven binary digit ASCII codes, however, may not be as elegantly represented and manipulated using base ten (decimal) values. Moreover, many of the base-two symmetries cannot be effectively exploited using base ten arithmetic. For example, adding or subtracting a value of thirty-two to the ASCII code representing an upper or lower case character does not present any base ten computational advantages.

More significantly, many of the most frequently used characters are represented by ASCII codes having values between one-hundred (100) and one-hundred and twenty-seven (127). Specifically, English lower case letters "d" through "z" are mapped to ASCII codes between one-hundred (100) and one-hundred and twenty-two (122). Thus, representing these characters using the traditional ASCII scheme requires three base ten digits. Other ASCII codes, on the other hand, may be represented with one or two base ten digits.

Presently, voice mail systems exchange text data represented by ASCII codes using standard defined dual tone multi frequency ("DTMF") signals. A method used by voice mail systems to exchange character data is disclosed in U.S. provisional patent application, serial No. 60/029,933, and a U.S. application claiming benefits therefrom, filed concurrently herewith, naming Gary Longster, Janusz Maruszak, Mervyn D'Cruz, and Brian Oliver as inventors and assigned to the assignee of the present application, and incorporated by reference herein. This method requires encoding ASCII codes using existing DTMF tones. Moreover, the method reserves the use of certain DTMF tones for use as delimiters and control codes. As such, only DTMF tones representing numerals "0–9" are available for exchanging ASCII encoded data. Using only the ten available digits, conventional ASCII codes could further be encoded to form signals comprised of one, two or three sequential and distinct DTMF tones. Each DTMF encoded ASCII code could be encoded using DTMF tones corresponding to the decimal value of the ASCII code. For example, the letter "z", mapped to an ASCII code of 122 could be encoded using sequentially produced DTMF tones "1", "2" and "2".

As will be appreciated, however, the use of the base ten representation of conventional ASCII codes would require using three sequential DTMF tones for many common English characters. Further, variable length DTMF codes having one, two or three tones requires properly delimiting the end of one encoded character from the next. This may require the use of additional tones.

U.S. Pat. No. 5,522,089 naming Kikinis et al. as inventors discloses a method for encoding all standard ASCII coded characters using two sequential DTMF tones. However, all available DTMF tones including digits "0"–"9"; "*"; "#"; and defined DTMF tones "A" to "D" are utilized. Thus, a total of two-hundred and fifty six possible pairs of sequential tones exist. As will be appreciated, this method does not lend itself to reserving some DTMF tones for use as special symbols.

Accordingly, the present invention attempts to overcome some of the disadvantages of known techniques to encode typographic characters.

SUMMARY OF THE INVENTION

It is an object of the present invention, to map ASCII codes for common typographic characters to two digit (base ten) codes.

Advantageously, the present invention, allows codes representing typographic characters to be reproduced with two sequential DTMF tones, with each tone chosen from the conventional DTMF tones representing digits "0" to "9".

In accordance with an aspect of the present invention, there is provided a method of numerically encoding a typographic character using a computing device, including the steps of: a. determining a value of a numeric standard ASCII code representing the character; and b. for the determined value greater than ninety-nine, mapping the character using the ASCII code to a two decimal digit numeric code having a value between zero and ninety-nine, using a defined mapping so that the numeric code uniquely identifies the character. c. for the determined value less than or equal to ninety-nine, mapping the ASCII code to a two decimal digit numeric code having a value between zero and ninety-nine, the numeric code having a value different than the ASCII code, using the defined mapping so that the numeric code uniquely identifies the character, wherein steps b. and c. further comprise subtracting an offset from the determined value to form the numeric code.

In accordance with another aspect of the present invention, there is provided a system of encoding a typographic symbol including: a. an input port for receiving a digital representation of a numeric standard ASCII code representing the character; and b. a mapper in communication with the input port, for mapping the ASCII code to a numeric code having a value between zero and ninety-nine, the numeric code uniquely identifying the character; c. an output port for outputting a digital representation of the numeric code, wherein the mapper is adapted to subtract an offset from the ASCII code to form the numeric code.

In accordance with a further aspect of the present invention, there is provided a method for decoding a two decimal digit numeric code to form a character, including: a. receiving the two decimal digit numeric code; b. mapping the two decimal digit numeric code to an ASCII code, wherein step b. further comprises adding a value of thirty-two to a value of the numeric code to form the ASCII code.

BRIEF DESCRIPTION OF THE DRAWING

In figures which illustrate, by way of example, embodiments of the present invention.

FIG. 2 is a table illustrating a mapping of characters to two digit codes, in accordance with an aspect of the present invention;

FIG. 3 is a flowchart of an encoding method used by the system of FIG. 1;

FIG. 4 is a flowchart of portion of the method of FIG. 3; and

DETAILED DESCRIPTION

Figure 1:
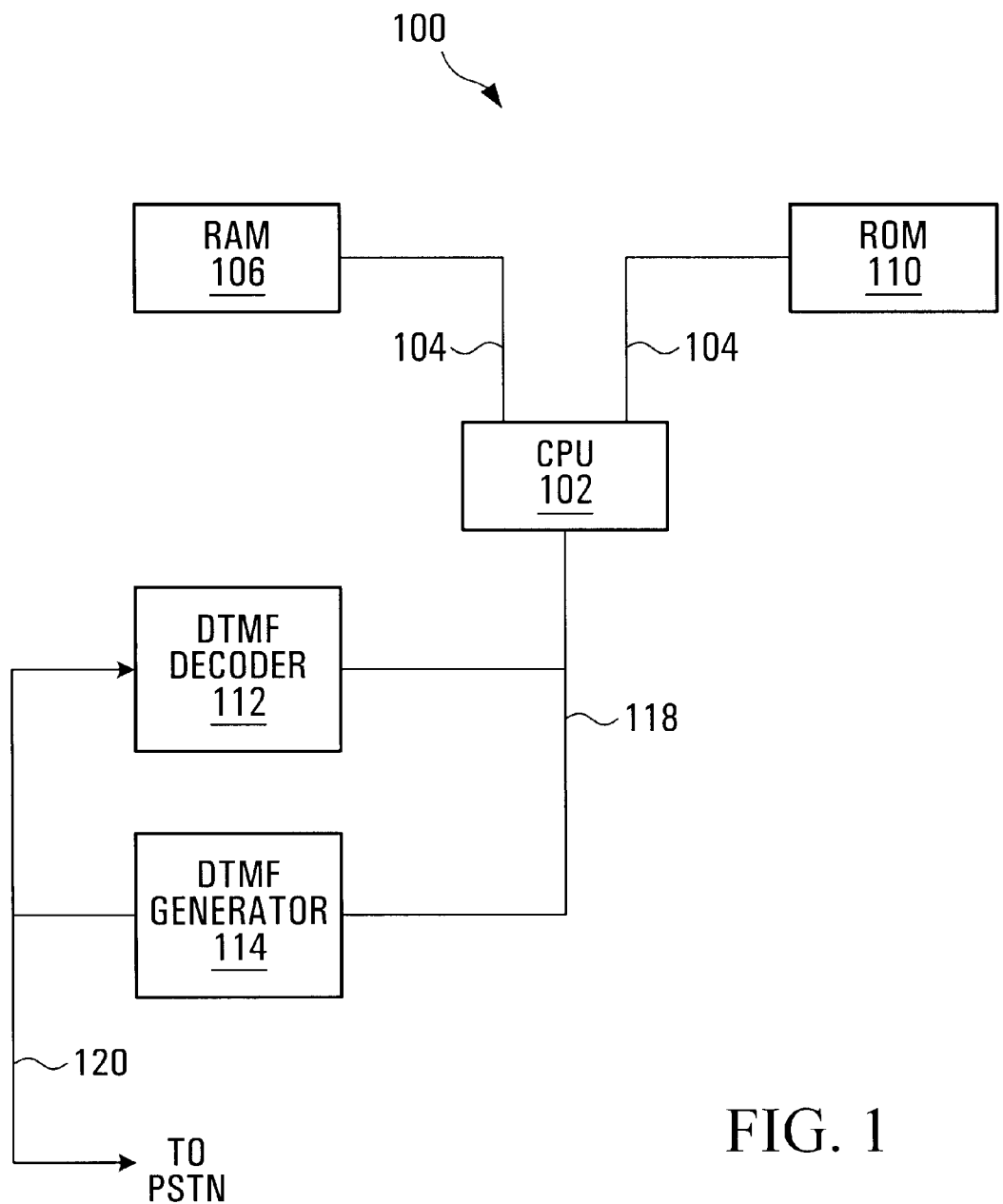
FIG. 1 is a block diagram of a system for encoding typographic characters in accordance with an aspect of the present invention.

FIG. 1 schematically illustrates a system 100 for encoding typographic characters and decoding two digit codes, exemplary of a preferred embodiment of the present invention. System 100 comprises a central processing unit ("CPU") 102. Interconnected with CPU 102 by address and memory buses 104 is dynamic memory 106; and program memory 110. DTMF decoder 112 and DTMF generator 114 are further connected to CPU 102 by peripheral bus 118. Other input and output peripherals may similarly be interconnected with processor 102, either by bus 118 or other peripheral buses.

DTMF generator 114 receives instructions from CPU 102 at bus 118, and produces an standard DTMF tones at output 120, responsive thereto. Output 120 also acts as an analog input for DTMF decoder 112. DTMF generator 114 may be a standard DTMF tone generator, or any may be any audio generator capable of generating dual frequency tones in the DTMF range.

DTMF decoder 112 receives an analog signal at input 120, and decodes any DTMF tones in the analog signal. The decoded values of these tones is presented to CPU 102 over bus 118.

CPU 102 is a conventional processor capable of receiving data from DTMF decoder 112, and providing instructions and data directing DTMF generator 114 to generate a desired DTMF tone at input/output 120. The length of each DTMF tone generated by generator 114 may be controlled by CPU 102 or by the generator 114. DTMF decoder 112 may be activated or deactivated by CPU 102.

DTMF tones received at input/output 120 are presented to DTMF decoder 112. When active, DTMF decoder 112 generates a four bit signal, presented at to CPU 102 on peripheral bus 118, in response to detecting a DTMF tone at input/output 120.

Input/output 120 is typically in communication with a communications channel used by system 100, to communicate with a similar system (not shown). This communication channel is typically a conventional telephone line connected to the public switched telephone network. However, input/output 120 could be in communication with any suitable channel, such as for example a radio frequency channel established by a conventional radio transmitter. Input/output 120 may thus be interconnected to an appropriate interface (not shown). Of course, input/output 120 could be formed on two separate interfaces, using separate communications channels.

As will be appreciated, the memory buses and peripheral buses 104 and 118, may be considered input and output lines to CPU 102 and act as input and output ports for the CPU 102.

Dynamic memory 106 is random access memory ("RAM") used by CPU 102 for temporary storage of data. Program memory 110 comprises permanent program storage, read-only memory ("ROM") to store a series of processor instructions to direct execution of CPU 102.

It will be understood that while dynamic, data and program memories 106, and 110 have been schematically illustrated as physically separate from each other, they may in fact all be formed on a single device or integrated with CPU 102. Program and data memories 110 and 108 may be flash memory, EPROMs, CD-ROM, or any other suitable memory medium accessible by CPU 102. Of course, program and data memories 110 and 106 may also be dynamic RAM; necessary program and data may be loaded into such memories prior to use of system 100 using conventional techniques through another input and output ("I/O") peripheral (not shown).

This other input and output peripheral (not shown) may comprise a conventional peripheral to allow access to system 100 by another processor, system or peripheral. The I/O peripheral may, for example, be a conventional RS232 serial port, a disk drive, or a terminal. This I/O peripheral or a part thereof could similarly be integrated with CPU 102. Alternatively, the I/O peripheral could be eliminated entirely. CPU 102 could receive commands from other systems using shared memory. Similarly, CPU 102 could receive commands from another software process executing on system 100 using process to process communication techniques.

FIG. 2 illustrates table 200, depicting a defined mapping of typographic characters into two digit codes, in accordance with a preferred embodiment of the present invention. As well, the equivalent ASCII code for each character is illustrated. Specifically, columns 202, 204 and 206 illustrate conventional typographic characters including upper and lower case English letters "A"–"Z" and "a"–"z". Columns 208, 210 and 212 illustrate the ASCII codes corresponding to the typographic characters in columns 202, 204 and 206. Corresponding two digit codes, encoding each typographic character, are illustrated in columns 214, 216 and 218. As will be appreciated, CPU 102 under program control acts as a mapping device, that maps ASCII codes in columns 208, 210 and 212 to corresponding two digit codes in columns 214, 216 and 218.

Each two digit code in column 214, 216 and 218 may be reproduced by sequentially reproducing two DTMF tones corresponding to numerals representing the individual digits in the two digit code. Thus, only the defined DTMF tones for the numerals "0" to "9" need to be used. Other DTMF tones corresponding to "#", "*" and "A" to "D" are not used. These DTMF tones may therefore be used to represent delimiters and other signalling information.

As illustrated, the two digit code for each character in columns 202, 204 and 206 may be formed by decrementing the ASCII code for that character, as illustrated in columns 208, 210 and 212 by thirty-two. As noted, a total of one hundred and twenty eight ASCII coded characters exist. However, only one-hundred (100) two (decimal) digit codes can exist. Therefore, no two digit code exists for characters having ASCII code representations between 0 and 31. These ASCII codes largely represent control characters, and may therefore be omitted in many applications.

In operation, system 100 is under program control of a program stored within ROM 110. A subroutine as illustrated in flowchart form in FIG. 3 and marked generally as 300, forms part of the program within program memory 110 and adapts system 100 to encode typographic characters in an embodiment of the present invention. Subroutine 300 is executed on CPU 102, in response to another portion of the program controlling overall execution of CPU 102 determining that a character string comprised of one or more characters needs to be converted into suitable two digit codes and encoded using DTMF tones. For example, system 100 may need to transmit a character based message using DTMF tones to another similar system, as disclosed in U.S. provisional patent application, serial No. 60/029,933, and a U.S. application claiming benefits therefrom, entitled "Voice Mail System and Method of Inter-Voice Mail System Communication", filed concurrently herewith, naming Gary Longster, Janusz Maruszak, Mervyn D'Cruz, and Brian Oliver as inventors and assigned to the assignee of the present application.

The string to be converted to be encoded using DTMF tones is provided to processor 102 in step S302. The string, or a pointer thereto, may be passed to subroutine 300. In step S304, the subroutine 300 determines the length of the string. Of course, the length of the string could be passed to the subroutine along with the string itself. Alternatively, the subroutine could be adapted to process a single character, and be executed for each character within a string.

In step S306, a temporary loop variable i, is given an initial value of 1 and stored within RAM 106. In step S308 the first character of the string is mapped to a two digit code suitable for reproduction by two DTMF tones in the set of DTMF tones corresponding to the digits "0" to "9".

In step S310, the first of the two DTMF tones is reproduced by DTMF generator 114 at output 120. In the preferred embodiment, each DTMF tone will have a duration of approximately 120 ms, followed by a pause of about 80 ms. The length of each tone may be controlled by CPU 102 under program control, or by DTMF generator 114. The length of each pause may be similarly controlled. After the first of two DTMF tones have been produced at output 120, the second tone is produced in step S312.

Preferably, two DTMF tones are sequentially reproduced for every two digit code formed in step S308. While it might be possible to use single DTMF tones for two digit codes having a leading zero, this would require extra delimiters or timing signals in order to properly decode.

In step S314, counter variable i is incremented.

In step S316, the subroutine determines whether the last character in the string has been encoded. If so, the subroutine ends, and control of the CPU 102 returns to the program that initiated execution of subroutine 300. If the last character of the string has not yet been encoded, steps S308 and onward are repeated for the second and subsequent characters in the string.

FIG. 4 is a flowchart further illustrating the substeps used in mapping the character into two digit code. Specifically, as noted above, subroutine 300 maps typographic character into two digit codes suitable for encoding using DTMF tones, as illustrated in FIG. 2. As part of step S308, the corresponding ASCII code for the character being encoded (ie. the $i^{th}$ character in the string) is determined in step S402. Typically, the string being processed will be provided to routine 300 as a series of ASCII codes. As such, determining the ASCII code for a letter in the string may only involve loading the $i^{th}$ provided ASCII code into a temporary variable, or determining its location in memory 106. Once the standard ASCII code has been determined, the value 32 is subtracted in step S404. This subtraction achieves the mapping illustrated in table 200 (FIG. 2). However, as will be appreciated, any one of many techniques could be used to properly map ASCII codes representative of common typographic characters to two digit codes between 00 and 99. For example, the entire table 200 could be stored in memory 106 or 110, and could be used as a look-up table in step S302. A multitude of other tables could be used to achieve a similar result.

Once the two digit (decimal) code has been determined, it may be parsed into two individual digits between 0 and 9 using conventional techniques. In step S406, these two values are returned for use in steps S310 and S312, during which the required DTMF tones are generated by DTMF generator 114.

Figure 5:
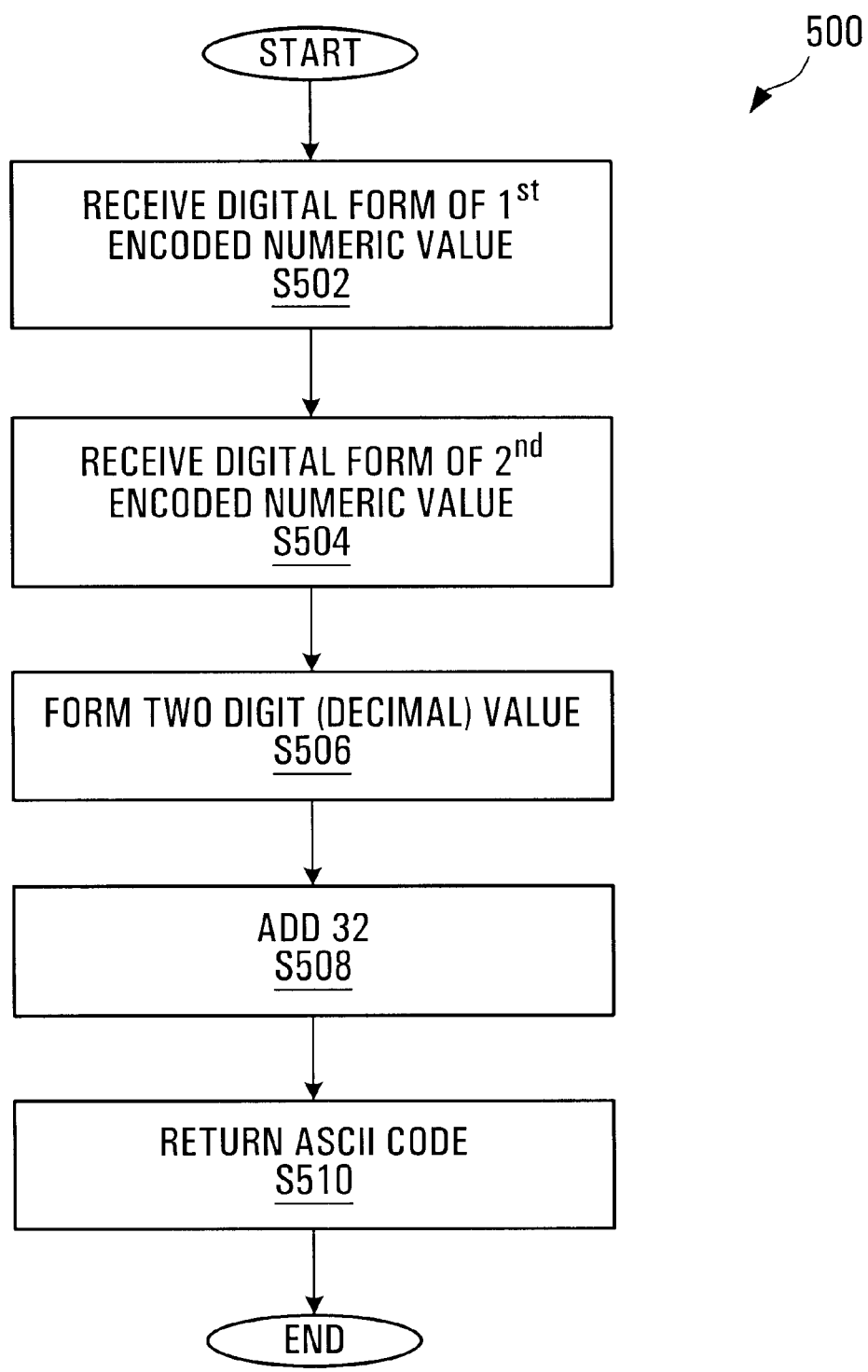
FIG. 5 is a flowchart of a decoding method used by the system of FIG. 4.

FIG. 5 is a flowchart illustrating a subroutine marked generally as 500 steps used by system 100 to decode DTMF tones received at DTMF decoder 112. This subroutine 500 also forms part of the program within program memory 110 and adapts system 100 to decode two digit codes into typographic characters. Subroutine 500 is executed on CPU 102, in response to another portion of the program controlling overall execution of CPU 102 determining that a two digit code needs to be converted into an ASCII character. Typically, subroutine 500 is executed after DTMF decoder is made active by CPU 102. The two digit code is typically generated by DTMF decoder 112, in response to receiving DTMF tones at input/output 120, when system 100 is adapted to receive DTMF encoded messages. For example, in addition to transmitting character based messages using DTMP tones, system 100 may also need to receive character based messages previously encoded using DTMF tones from a similar system, as also disclosed in U.S. provisional patent application, serial No. 60/029,933, and a U.S. application claiming benefits therefrom, filed filed concurrently herewith, naming Gary Longster, Janusz Maruszak, Mervyn D'Cruz, and Brian Oliver as inventors and assigned to the assignee of the present application.

In step S502, the first of the two digit codes (typically the least significant digit) is presented to processor 102. Typically, the digital value of this code is presented to an input port, or memory address of processor 102, by DTMF decoder 112. Thereafter, a second of the two digit codes (typically, the most significant digit) is presented to processor 102 in step S504. In step S506 the two digits are concatinated, and combined to a binary value representative of the two decimal digit value. In step S508, a value of thirty two is added to the two decimal digit value. This value represents the ASCII code corresponding to the two digit code using the mapping illustrated in table 200. This ASCII code value is returned to the portion of the software program initiating execution of subroutine 500. As will be apparent, the subroutine 500 will only correctly decode codes previously encoded using the mapping in table 200. If a different mapping is used in forming the two digit codes, subroutine 500 will need to be modified accordingly.

As will be appreciated subroutine 500, could cause CPU 102 to buffer numerous encoded numeric values or one or more ASCII codes until a complete word or message has been decoded.

As well, the above described system 100 or any portion thereof could easily be embodied in an application specific integrated circuit ("ASIC"). Thus, the functionality of CPU 102 executing subroutines 300 or step S308 could be replaced by an ASIC that maps ASCII code values to two digit codes, suitable for reproduction by a DTMF generator 114. As well, the fuctionality of CPU 102 executing subroutine 500 could be replaced by an ASIC that maps received two digit numeric codes to conventional ASCII codes in order to decode typorgraphic characters previously encoded using subrouting 300. Similarly, DTMF generator 114 and decoder 112 could also be integrated on any such ASIC.

While system 100 is well suited to producing encoding typographic symbols using DTMF tones corresponding to DTMF tones "0" to "9", the method of mapping characters employed by system 100 could easily be employed in other applications. As will be appreciated, storing character data in computer memory using the numerical mapping illustrated in FIG. 2, would result compress the total number of base ten digits required to store the data. Additionally, for example, any ten unique codes could be used to encode the two digit code; other DTMF tones could, for example, be used.

It will further be appreciated that numerous mapping schemes other than the scheme illustrated in table 200 could be employed. For example, adding and subtracting a defined value between twenty-three and forty-eight from and to existing ASCII codes will result in a mapping scheme that effectively maps all letters in the English alphabet, and numbers to two digit codes.

It will be understood that the invention is not limited to the illustrations described herein which are merely illustrative of a preferred embodiment of carrying out the invention, and which are susceptible to modification of form, size, arrangement of parts and details of operation. The invention, rather, is intended to encompass all such modification within its spirit and scope, as defined by the claims.

I claim:

1. A method of numerically encoding a typographic character using a computing device, comprising the steps of:

a. determining a value of a numeric standard ASCII code representing said character; and b. for said determined value greater than ninety-nine, mapping said character using said ASCII code to a two decimal digit numeric code having a value between zero and ninety-nine, using a defined mapping so that said numeric code uniquely identifies said character, c. for said determined value less than or equal to ninety-nine, mapping said ASCII code to a two decimal digit numeric code having a value between zero and ninety-nine, said numeric code having a value different than said ASCII code, using said defined mapping so that said numeric code uniquely identifies said character, wherein steps b. and c. further comprise subtracting an offset from said determined value to form said numeric code.

2. The method of claim 1, wherein said offset exceeds twenty-two.

3. The method of claim 2, wherein said offset is less than forty-nine.

4. The method of claim 3, wherein said offset equals thirty-two.

5. A system for encoding a typographic symbol comprising:

a. an input port for receiving a digital representatiol L of a numeric standard ASCII code representing said character; and b. a mapper in communication with said input port, for mapping said ASCII code to a numeric code having a value between zero and ninety-nine, said numeric code uniquely identifying said character;

c. an output port for outputting a digital representation of said numeric code, wherein said mapper produces a value different than said ASCII code, for all ASCII codes, wherein said mapper is adapted to subtract an offset from said ASCII code to form said numeric code.

6. The system of claim 5, wherein said offset exceeds twenty-two.

7. The system of claim 6, wherein said offset equals thirty-two.

8. A method of decoding a two decimal digit numeric code to form a character, comprising:

a. receiving said two decimal digit numeric code;

c. mapping said two decimal digit numeric code to an ASCII code representing said character, using a defined relationship between said numeric code and said ASCII code, wherein step b. further comprises adding a value of thirty-two to a value of said numeric code to form said ASCII code.

* * * * *